(12) United States Patent
Chen

(10) Patent No.: US 8,523,204 B2
(45) Date of Patent: Sep. 3, 2013

(54) STRUCTURE OF CONNECTABLE SKATEBOARD

(76) Inventor: Chia-Liang Chen, Hsinchu (TW)

( * ) Notice: Subject to any disclaimer, the term of this patent is extended or adjusted under 35 U.S.C. 154(b) by 194 days.

(21) Appl. No.: 12/756,158

(22) Filed: Apr. 7, 2010

(65) Prior Publication Data

US 2011/0248460 A1   Oct. 13, 2011

(51) Int. Cl.
*A63C 17/01* (2006.01)
*B62B 1/00* (2006.01)
*B62M 1/00* (2010.01)

(52) U.S. Cl.
USPC ............... 280/87.021; 280/87.05; 280/79.11

(58) Field of Classification Search
USPC .......... 280/20, 87.01, 87.041, 87.042, 87.05, 280/79.11, 79.3
See application file for complete search history.

(56) References Cited

U.S. PATENT DOCUMENTS

| 4,287,693 | A | * | 9/1981 | Collette | 52/177 |
| 5,413,236 | A | * | 5/1995 | Kenevan | 220/4.28 |
| 5,553,875 | A | * | 9/1996 | Ulicne et al. | 280/20 |
| 6,095,348 | A | * | 8/2000 | Karashima | 211/175 |
| 6,550,794 | B1 | * | 4/2003 | Spindel et al. | 280/79.11 |
| 2002/0158437 | A1 | * | 10/2002 | Carbonero | 280/87.041 |
| 2003/0155732 | A1 | * | 8/2003 | Carbonero | 280/87.01 |

* cited by examiner

*Primary Examiner* — J. Allen Shriver, II
*Assistant Examiner* — Bridget Avery
(74) *Attorney, Agent, or Firm* — Leong C. Lei

(57) ABSTRACT

A structure of connectable skateboard includes a skateboard body that carries casters. The skateboard body has a front end forming a plurality of connection lugs and a rear end forming a plurality of mating slots at locations corresponding to the connection lugs, whereby with the inter-engagement between the connection lugs and the corresponding mating slots, multiple skateboard bodies can be inter-connected to each other to form a connected skateboard assembly.

3 Claims, 3 Drawing Sheets

STRUCTURE OF CONNECTABLE SKATEBOARD

TECHNICAL FIELD OF THE INVENTION

The present invention generally relates to a structure of connectable skateboard, which comprises a single skateboard body that carries casters or rollers and has a front end forming a plurality of connection lugs and an opposite rear end forming mating slots corresponding in position to the connection lugs, so that a plurality of skateboard bodies can be connected to each other through mating coupling of the connection lugs of a first body to the mating slots of a second body to form a combined skateboard assembly.

DESCRIPTION OF THE PRIOR ART

The skateboard referred to herein is an integral board having a bottom carrying a plurality of casters and constructed to allow for inter-connection between two of such boards to form a movable skateboard assembly. An example of the skateboard of this kind is shown in U.S. Pat. Nos. 6,561,530B2 and 7,213,819, which disclose a gym scooter comprising a flat board like platform, which is of a substantially rectangular shape or a curved shape to serve as a single unit body. The unit body has a first end forming an elongate L-shaped coupling member in which retention elements are provided and an opposite second end forming a coupling plate in which notches are formed to correspond to the retention elements. With such a structure of the unit body, the L-shaped coupling member of the first end of a first unit body can be coupled to the coupling plate of the rear end of a second unit body through inter-engagement between the retention elements and the notches, whereby the two unit bodies are securely coupled to each other. However, such a coupling arrangement of the gym scooters is realized by face-to-face engagement between the L-shaped coupling member on the front end and the coupling plate on the rear end and often suffers insufficient coupling strength.

SUMMARY OF THE INVENTION

The present invention provides a structure of connectable skateboard, which mainly comprises a plurality of connection lugs formed in a front end of a skateboard body and a plurality of mating slots formed in a rear end of a skateboard at locations corresponding to the connection lugs, whereby with the inter-engagement between the connection lugs and the corresponding mating slots, multiple skateboard bodies can be inter-connected to each other so as to realize fast connection and secure coupling of high strength.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
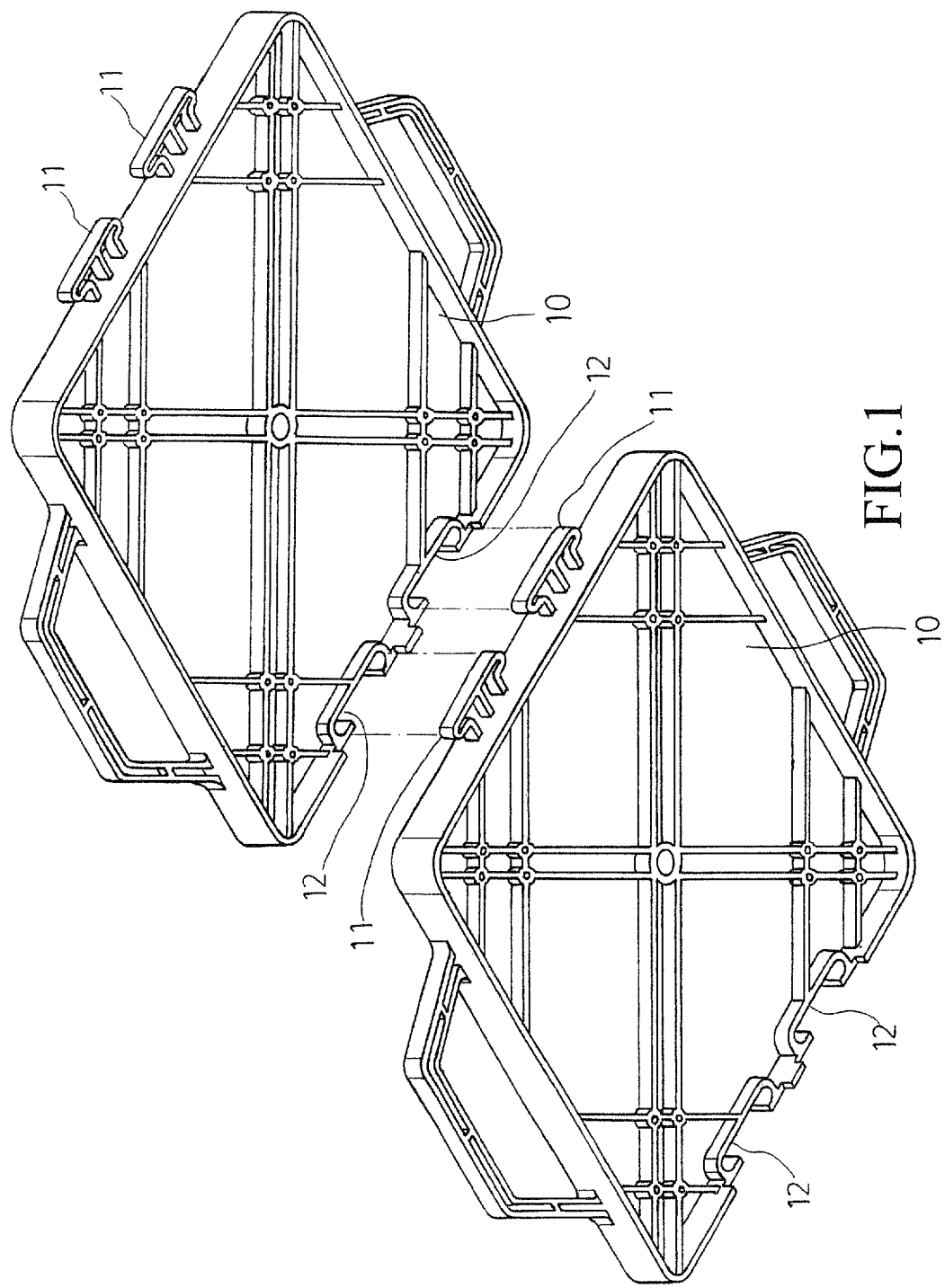
FIG. 1 is a perspective view, taken from the underside, of connectable skateboards according to the present invention.
Figure 2:
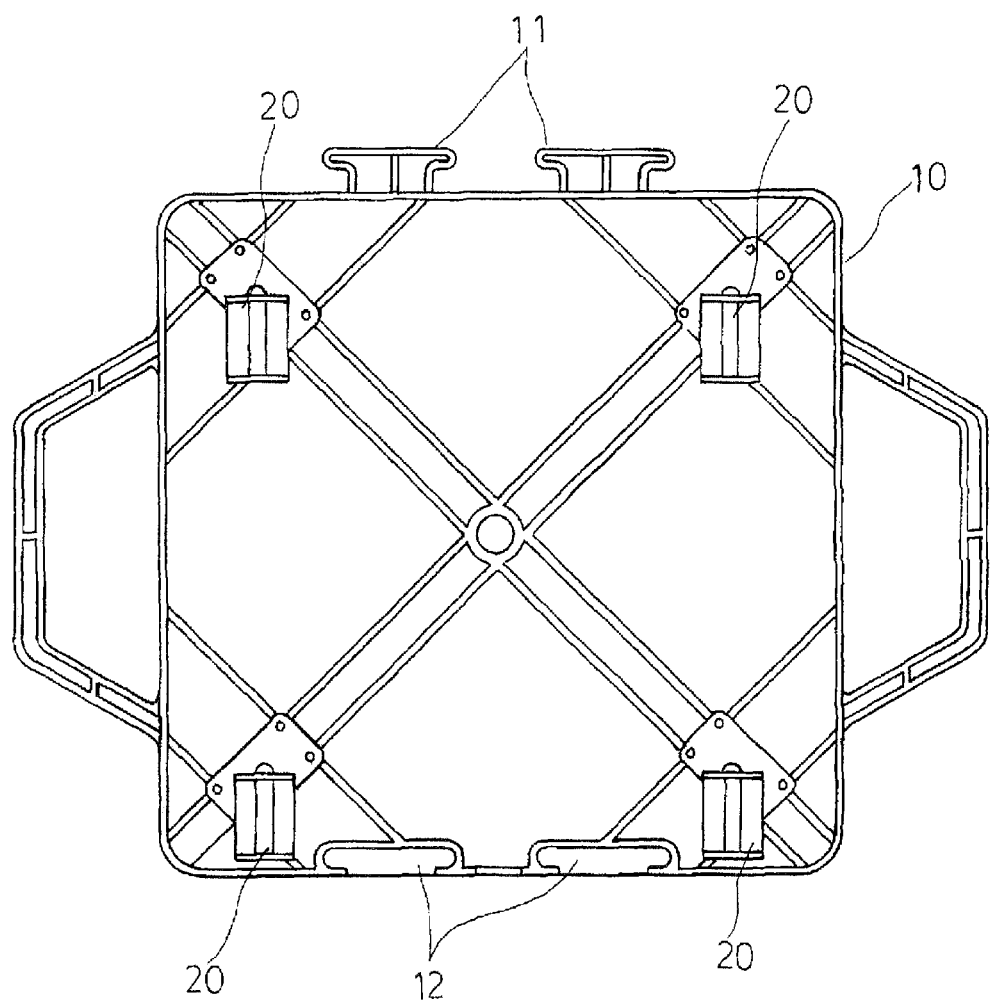
FIG. 2 is a bottom plan view of the connectable skateboard of the present invention.
Figure 3:
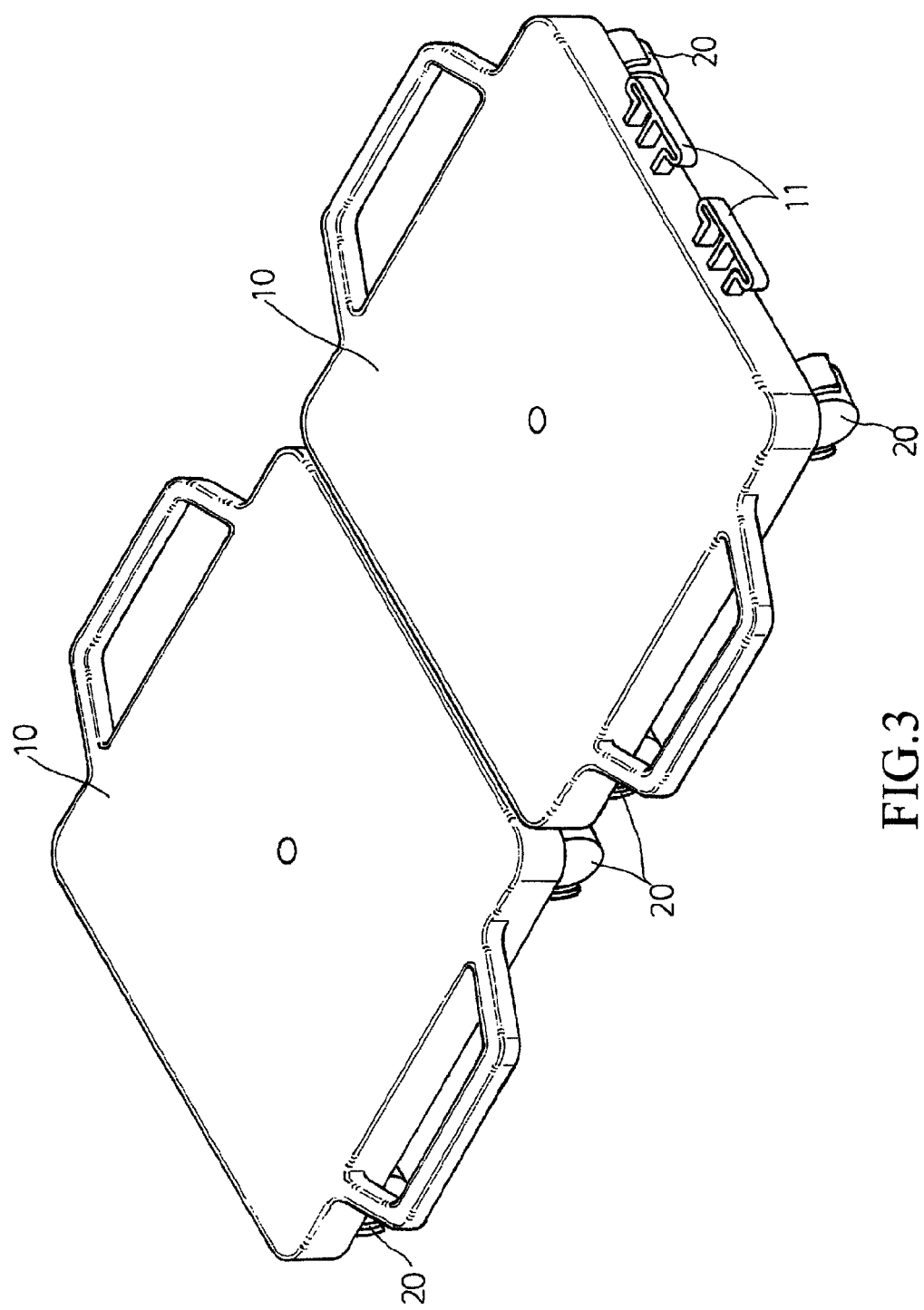
FIG. 3 is a perspective view showing two connectable skateboards of the present invention that are connected to each other.

The present invention provides a structure of connectable skateboard, which comprises a unit skateboard body that is preferably in the form of a substantially flat board having a bottom to which a plurality of casters or rollers 20 are mounted. The structure allows multiple unit skateboard bodies to connect together to form a movable skateboard assembly, as shown in FIGS. 1 and 2. The connection arrangement of the unit skateboard bodies comprises two (or more) connection lugs 11 that extend outward from a front end of a unit skateboard body 10 and a plurality of mating slots 12 that are formed in a rear end of the unit skateboard body at locations corresponding to the connection lugs 11 and are complementary in shape and size to the connection lugs 11. Preferably, the connection lugs 11 are of a T-shape, and the mating slots are of the same shape and size. Referring to FIGS. 1 and 3, to connect to the unit skateboard bodies to form a connected skateboard assembly, the connection lugs 11 of a first unit body 10 are fit respectively into the mating slots 12 of a second unit body 10, whereby the first and second unit bodies are connected to each other. In this way, a plurality of unit skateboard bodies can be connected, in cascade, to form a skateboard assembly. Connection of this form allows for efficient and quick connection and secure coupling of high strength.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of connectable skateboard comprising a skateboard body that carries casters, the skateboard having a front end forming two connection lugs extending away from the front end and a rear end forming mating slots that correspond in position and number to the connection lugs, the connection lugs being of a T-shape and the mating slots being of complementary shape and size, the skateboard comprising one force application portion adapted to receive an external force applied to the skateboard to move the skateboard, whereby the connection lugs of a first skateboard body are engageable with the mating slots of a second skateboard to allow the skateboard bodies of the first and second skateboards to connect to each other in such a way that the skateboard bodies are connected in a cascade arrangement, whereby the skateboard bodies are kept connected to each other when the external force is applied to the first skate board in a first direction toward the second skateboard for moving the first and second skateboards together in the first direction and the skateboard bodies are kept connected to each other when the external force is applied to the first skateboard in a second direction-away from the second skateboard for moving the first and second skateboards together in the second direction, the skateboard bodies being also kept connected to each other when the first and second skateboards are moved together in a third direction that is substantially perpendicular to the first and second directions and also in a fourth direction opposite to the third direction.

2. The structure of connectable skateboard according to claim 1, wherein the skateboard body forms a number of connection lugs and mating slots that are of the same number as the connection lugs.

3. The structure of connectable skateboard according to claim 1, wherein force application portion comprises at least one handle mounted to one side of the skateboard body.

* * * * *